(12) United States Patent
Boehl et al.

(10) Patent No.: US 9,501,370 B2
(45) Date of Patent: Nov. 22, 2016

(54) TIMER MODULE AND METHOD FOR TESTING OUTPUT SIGNALS OF A TIMER MODULE

(75) Inventors: Eberhard Boehl, Reutlingen (DE); Stephen Schmitt, Nuertingen (DE); Juergen Hanisch, Bempflingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1088 days.

(21) Appl. No.: 13/637,130

(22) PCT Filed: Mar. 17, 2011

(86) PCT No.: PCT/EP2011/054067
§ 371 (c)(1),
(2), (4) Date: Dec. 5, 2012

(87) PCT Pub. No.: WO2011/120818
PCT Pub. Date: Oct. 6, 2011

(65) Prior Publication Data
US 2013/0073256 A1 Mar. 21, 2013

(30) Foreign Application Priority Data
Mar. 31, 2010 (DE) .................. 10 2010 003 551

(51) Int. Cl.
*G06F 11/00* (2006.01)
*G06F 11/16* (2006.01)
*G06F 1/04* (2006.01)

(52) U.S. Cl.
CPC ....... *G06F 11/1604* (2013.01); *G06F 11/1679* (2013.01); *G06F 1/04* (2013.01); *G06F 11/1608* (2013.01)

(58) Field of Classification Search
CPC ... G06F 11/1604; G06F 11/1608; G06F 1/04
See application file for complete search history.

(56) References Cited

U.S. PATENT DOCUMENTS

| 4,282,493 A | 8/1981 | Moreau |
| 4,683,570 A * | 7/1987 | Bedard ................. G06F 11/187 714/797 |
| 5,081,629 A | 1/1992 | Criswell et al. |
| 5,537,583 A | 7/1996 | Truong |
| 5,568,097 A * | 10/1996 | Woodman, Jr. ........... G06F 1/04 327/147 |
| 5,657,330 A * | 8/1997 | Matsumoto ............. G06F 11/27 714/733 |

FOREIGN PATENT DOCUMENTS

| DE | 199 50 131 | 11/2000 |
| DE | 10 2004 051 992 | 4/2006 |
| EP | 0 653 708 | 5/1995 |

OTHER PUBLICATIONS

International Search Report for PCT/EP2011/054067, dated Jun. 21, 2011.

* cited by examiner

*Primary Examiner* — Charles Ehne
(74) *Attorney, Agent, or Firm* — Norton Rose Fulbright US LLP; Gerard Messina

(57) ABSTRACT

In a timer module having at least two output channels, the at least two output channels are configurable in such a way that they generate redundant output signals, and the generation of the redundant output signals begins synchronously. In addition, the timer module has provides a comparison of the redundant output signals by an EXOR logic operation and stores a result of the EXOR logic operation in a way that allows the result to be retained for an erroneous comparison until it is reset by an access.

6 Claims, 3 Drawing Sheets

TIMER MODULE AND METHOD FOR TESTING OUTPUT SIGNALS OF A TIMER MODULE

BACKGROUND OF THE INVENTION

1. Field of the Invention

The present invention relates to a timer module and to a method for testing output signals of a timer module.

2. Description of the Related Art

It is customary in safety-critical applications, for example, for control units in the automotive sector, for various output signals and values to be redundantly calculated or generated and subsequently compared. This allows erroneous signals and values to be detected, and, if indicated, to be rejected or also corrected. To this end, the data are calculated by bytes or words, and stored, before the comparison is performed.

The German Patent Application DE 10 2004 051 992 A1 describes activating a comparison by switching two processing units to a comparison mode. For such a comparison, clock cycle information can be supplied along with the data to permit a synchronous allocation of the data. If a synchronous comparison is to take place immediately, the one processing unit can be stopped by a stop signal until synchronization is reached, or the generated data are mutually synchronized by subsequent FIFO memory units.

BRIEF SUMMARY OF THE INVENTION

The present invention makes possible an especially efficient, rapid and flexibly configurable testing of an output signal of a hardware data processing unit, in particular of a timer unit, for example, a control unit, by the comparison of the output signal to a redundant output signal. It is especially efficient for the testing of the comparison of the redundant output signals to be realized as an EXOR logic operation (exclusive OR, antivalence). In the case of a comparison error, thus, in response to non-conforming bits of the redundant signals, an especially reliable and efficient error detection may be achieved in that the corresponding error signal is written as an identifier into a status register in a way that allows it to be retained, even in the case of subsequent, successfully compared further bits, until it is reset by an access, preferably by the access of an external processing unit. This allows the external processing unit, for example, to query, respectively reset the error or status register, depending on the testing, or also as a function of other conditions (work load of the processing unit).

An especially flexible embodiment provides that the execution of the comparison be able to be enabled or denied by the configuration, for example, in a comparison module that executes the comparison.

In addition, an especially high level of security may be achieved, if, for example, as a function of the error detection in the status register, an erroneous comparison of two bits of the compared, redundant output signals leads to the outputting of an error signal (within the timer module or outwardly) and/or to the interruption of an external processing unit by an interrupt.

DETAILED DESCRIPTION OF THE INVENTION

A timer module of a control unit may preferably be implemented as an IP block in the microcontroller of a control unit, for example, of a vehicle control unit. It combines the time and, if indicated, trigonometric functions, receives signals from the sensor system of the vehicle (for example, rotation-rate sensor of an ESP), respectively, evaluates the same and acts on the actuators of the automobile (for example, on the driving dynamics in the case of "swerving"). As described in the following, such a timer could also be alternatively integrated in an output stage or provided separately. However, it always requires a configurable unit (for example, an external processing unit). In the case of an integration thereof in the control unit microcontroller, for example, this is the or a control unit CPU (respectively, processing unit).

Figure 1:
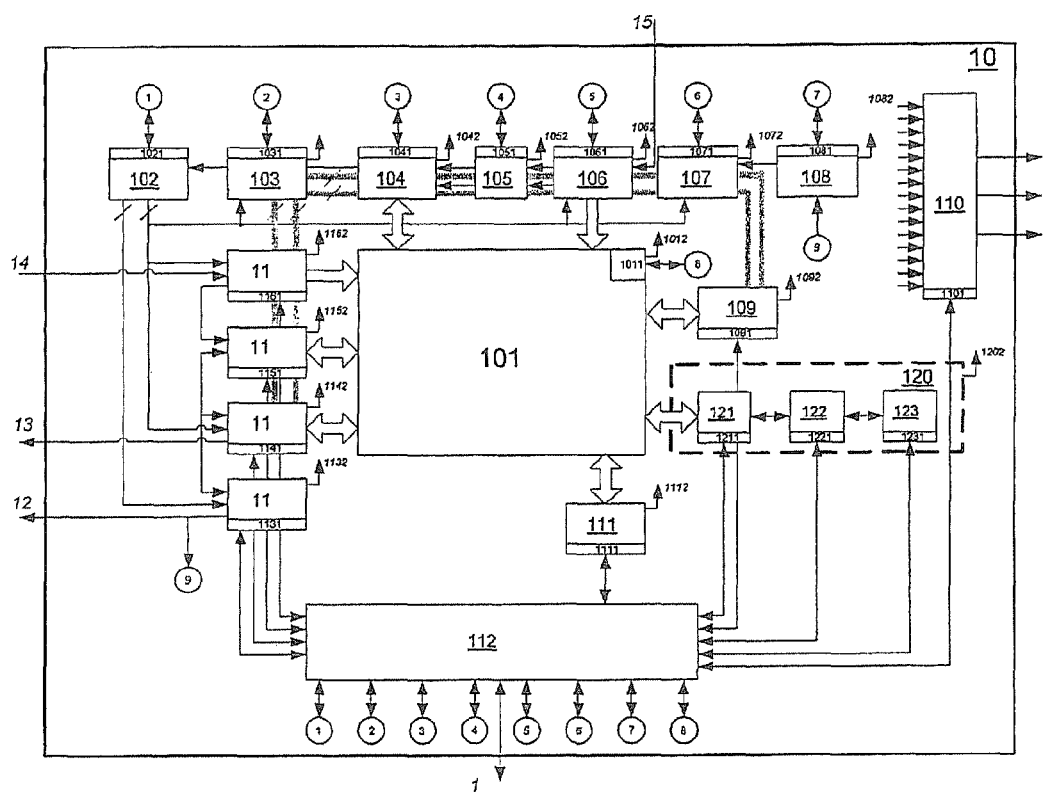
FIG. 1 shows a schematic representation of a timer module.

FIG. 1 shows the overall architecture of an exemplary timer module 100. In simplified terms, the overall structure of the timer module includes signal-input unit(s) 116, which output(s) the values to a routing unit 101; these values are processed in other modules, and the processed values are routed via routing unit 101 to output unit 114. The parallel method of operation of the modules described in the following makes it possible for a large number of requests to be handled within a short period of time. If certain modules are not needed, they may be switched off to save power (power consumption, temperature reduction).

The core of timer module 100 is central routing unit 101 to which input (for example, module(s) 116), output (for example, module(s) 114), processing (for example, module 109) and memory units (for example, module 120) are connected.

Routing unit 101 flexibly and configurably interconnects the modules and provides a new interrupt concept for a timer module in that the data are requested and transmitted in a blocking process. It manages without the implementation of an interrupt controller, thereby economizing surface area and thus chip costs. A central concept of timer unit 100 is the routing mechanism of routing unit 101 for data streams. Each module (respectively, submodule) of timer module 100, that is linked to routing unit 101, may have any given number of routing-unit write channels (data sources) and any given number of routing-unit read channels (data sinks). The concept of routing unit 101 provides for flexibly and efficiently linking any given data source to any given data sink. This may be realized by the data routing mechanism, as is known from the non-prepublished German Patent Application 10 2009 00 189.

Parameter memory module 120 is composed of three subunits 121, 122 and 123. Subunit 121 constitutes the interface between FIFO (first-in, first-out) memory 122 and routing unit 101. Subunit 123 constitutes the data interface between the generic bus interfaces of the modules, respectively multiplex device 112 (see below) and FIFO 122. Parameter memory module 120 may serve as the data memory for incoming data characteristics or as the parameter memory for outgoing data. The data are stored in a memory, for example, a RAM that, logically, is located within FIFO subunit 122.

Timer input module 116 (preferably composed of a plurality of inputs) is responsible for the filtering and reception of input signals from timer module 100. Various characteristics of the input signals may be measured within the channels of timer input module 116. In this context, the signals are linked to time information and other physical information in timer input module 116, and, following the processing and, in some instances, intermediate storage in output unit 114, are used for generating output signals. The physical information is, for example, the angle of an engine or also any other physical variable, such as mass, temperature, liquid level, phase relation of a vibration, a number of events (edges) or the period duration of a signal. Input characteristics may, for example, include time stamp values of detected rising or falling input flanks, together with the new signal level or the number of flanks since a channel enabling, together with the current time stamp or PWM signal lengths for a whole PWM period. The values, which are allocated to an input signal, such as the value of the time base and the value of the angle base at the time of the input event, thus characterize the input signal and allow calculations in further modules which are connected to routing unit 101 (for example, module 109) and then may function in response to an output unit (output unit 114) in which output values are generated as a function of the transmitted values in conjunction with the current time-base and/or angle-base values.

For advanced data processing, the detected input characteristics of timer input module 116 are routed through routing input 101 to further processing units of timer module 100.

The unit for clock pulse processing 102 is responsible for the clock pulse generation of the counters and of timer module 100. It makes configurable clock pulses available; and time base unit 103, together with both time-, as well as position-related counters, provides a common time base for timer module 100, respectively makes available current time and positional information (for example, angles).

The individual modules are supplied with clock pulses and time bases and, via routing unit 101, exchange data with one another. Comparators locally present in the individual modules compare the data to the current time and/or position, and decisions made in the process, such as the switching of an output signal, for example, are signaled.

In the case of the routing of the data by routing unit 101, branching unit 111 also makes the data from a source available to a plurality of data sinks in one or a plurality of modules, since a reading of the data in a blocking process is generally provided that only permits the one-time reading of a datum from a source. Since each write address is only able to be read from one single module for the submodule channels of timer module 100 that are able to write to routing unit 101, it is not possible for a data stream of various modules to be provided in parallel. This does not apply to sources, which do not make the data thereof invalid, after the data have been read by a receiver, as may be provided, for example, for DPLL module 104. To resolve this problem for regular modules, branching unit 111 allows data streams to be duplicated a plurality of times. This submodule 111 makes input and output channels available. To clone an incoming data stream, the corresponding input channel may be mapped onto one or a plurality of output channels.

DPLL (digital phase locked loop) module 104 is used for frequency-division multiplexing. The purpose of this module 104 is a greater accuracy of the positional or value information, also in the case of applications involving rapidly varying input frequencies. From position-related input signals, DPLL module 104 generates pulses which make possible more finely subdivided positional information in time-base unit 103. Thus, for example, an angle clock may indicate a finer resolution of an angle of rotation than that specified by the input signals. Moreover, information on speed or rotational speed is available in DPLL module 104, and a prediction may be made as to when a predefined position will be reached, also taking into account an advance in time (for instance, allowing for the inertia of the trigger module). The input signals for DPLL module 104 are transmitted via timer input module 106, filtered in an input mapping module 105 or also in a sensor-pattern evaluation module 115, for example, combined, in particular, for the evaluation of electromotors.

Thus, compared to other timer input modules 116, timer input module 106 has the special feature that it transmits current filter values, which it uses to filter input signals, to input mapping module 105 and DPLL module 104. There, the filter values are included in the time stamp of the filtered edge to obtain an actual edge time.

Sensor pattern evaluation module 115 may be used for evaluating the inputs of a plurality of Hall sensors and, together with timer output module 113 (preferably composed of a plurality of outputs), to assist in the operation of direct-current machines (BLDC, brushless direct current). In addition, sensor pattern evaluation module 115 may also be used, for example, for calculating the rotational speed of one or two electrical machines.

Output comparison unit 108 may be used for the bitwise mutual comparison of output signals. It is conceived for use in safety-critical applications. The main idea in this case is to have the option to double outputs to enable them to be compared in this unit. If a simple EXOR (exclusive OR) function is used for this purpose, for example, it may be necessary to ensure the output behavior of a complete cycle of the output modules to be compared. As shown in FIG. 1, output comparison unit 108 is linked via the connection indicated by reference numeral 9 to the connection between timer output module 113 and pin 12.

Monitoring unit 107 is likewise conceived for use in safety-critical applications. The main idea in this case is to have the option to monitor shared circuits and resources. Thus, the activity of the clocks, as well as the basic activity of routing unit 101 are monitored. Monitoring unit 107 renders possible the simple monitoring of central signals for safety-critical applications by an external CPU (central processing unit), respectively generally an external processing unit.

Interrupt request lines of the modules are characterized in FIG. 1 by four-digit reference numbers ending in "2" and by the first three digits in accordance with the module. Interrupt concentration module 110 is used for suitably bundling interrupt request lines XXX2 of the individual submodules in interrupt groups, and then for further transmission to the external processing unit.

All modules are configurable by the processing unit via a bus interface (universal handshaking interface). Data are also exchangeable via this bus interface. The outputs are hereby configured for periodic processes, for example, for the output module, timer output module 113, that is not connected to the routing unit. Timer output module 113 provides independent channels, for example, to generate (pulse width modulated) signals at each output pin. In addition, a pulse counter-modulated signal may be generated at an output of timer output module 113.

Due to connection thereof to router unit 101, timer output module 114 linked to router unit 101 is able to generate complex output signals without CPU interaction. Via the connection to router unit 101, output signal characteristics are typically made available by submodules connected to router unit 101, such as, for example, DPLL submodule 104, multichannel sequencer module 109 or parameter memory module 120.

Multichannel sequencer module 109 is a generic data processing module that is linked to routing unit 101. One of the main uses thereof is to compute complex output sequences that may depend on the time base values of time base unit 103 and that are processed in combination with module 114. Each submodule of timer output module 114 linked to router unit 101 includes output channels, which may operate mutually independently in various configurable operating modes.

Microcontroller bus is denoted in FIG. 1 by reference numeral 11; various pins (respectively, pin groups) are denoted by reference numerals 12-15.

The timer module is equipped with a generic bus interface which may be versatilely adapted to different SoC busses (SoC=system on a chip). The adaptation of the generic bus interface is typically achieved via a bridge module which translates the signals of the generic bus interface to the signals of the particular SoC bus. The generic bus interfaces of the modules are characterized in FIG. 1 by four-digit reference numbers ending in "1" and the first three digits in accordance with the module Multiplex device 112 multiplexes the generic bus interfaces. In FIG. 1, the connections between generic bus interfaces XXX1 and multiplex device 112 are indicated by reference numerals 1-8.

It is intended that a comparison, in particular a bitwise comparison take place for at least two redundant output signals of a hardware data processing unit, for example, timer module 100 of a control unit, in particular, to ensure, respectively monitor that an output signal is error-free by the comparison thereof to a redundantly generated signal. To this end, the following describes, inter alia, how it is made possible for the redundant signals to be generated synchronously, and how the bitwise comparison of the signals may be achieved without additional storing thereof.

Figure 2:
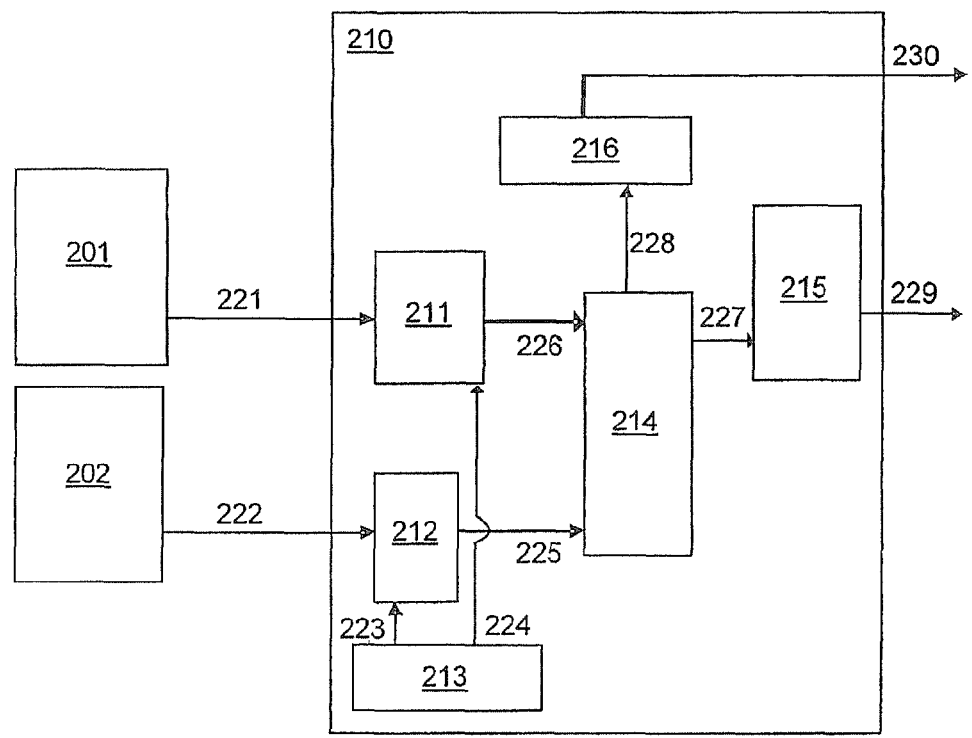
FIG. 2 shows a schematic representation of a comparison module.

FIG. 2 schematically shows an exemplary configuration of output comparison unit 108 from FIG. 1. In this context, output comparison unit 108 is denoted by reference numeral 210. Reference numerals 201 and 202 denote output modules, preferably each having a plurality of output channels.

In this embodiment, output module 201 corresponds to output module 114 in FIG. 1, and output module 202 to output module 113 in FIG. 1. If it is intended to test the output signal of one of the channels of the two output modules 201 or 202, this output signal may be redundantly and synchronously generated by a further channel of the same output module, and be transmitted via connection 221 or connection 222 to output comparison unit 210. In this context, connections 221 and 222 optionally correspond to a plurality of lines. Output module 201 is linked via connection 221 to a comparison unit 211; output module 202 via connection 222 to a comparison unit 212. In these comparison units, the redundantly generated signals may be compared to one another bit-by-bit, and the comparison result stored. The comparison, respectively comparison units 211, respectively 212 are enabled by enable unit 213 via connections 223, respectively 224. Comparison units 211 and 212 are each connected to error signal control 214 which determines, respectively controls measures as a function of the comparison results. For this purpose, error signal control 214 is linked via connection 227 to error signal generator 215 and via connection 228 to interrupt generator 216. Error signal generator may, alternatively, transmit an error signal via a connection 229 to another module of timer unit 100, for example, to monitoring unit 107, or an error signal outwardly, thus externally to the timer module. Via interrupt connection 230, interrupt generator 216 may effect an interrupt of external processing unit (CPU).

The comparison of the output signals should take place in a configurable manner; in particular, it is intended that the external processing unit enable and configure a comparison process via configuration bits in output comparison unit 108, respectively 210. The two channels of output modules 201 and 202, which generate the signals to be compared, may, in principle, be used alternatively to the "comparison configuration" by suitable configuration by the processing unit, also to generate various independent signals. To this end, depending on the application, configuration bits are additionally set in output comparison unit 108, respectively 210 and output modules 201 and 202.

It is intended that the signal generation of the signals to be compared begin synchronously for the comparison of the redundant output signals to be carried out. This allows a direct, synchronous serial comparison of the data, without having to evaluate additional clock pulse information or use a stop signal to stop one of the two signal generators (thus, one of output modules 201 or 202) until synchronization is achieved. The comparison of the redundant signals may then be realized in comparison units 211 and 212 by an EXOR function (exclusive OR, respectively antivalence).

In output comparison unit 108, at least two (for example, adjacent) output channels of output modules 113 and 114 are configured in a way that allows comparison thereof by setting of configuration bits, for example, by the external processing unit. This encompasses the redundant outputting of the same output signal by both outputs and the simultaneous start of signal generation by the two output channels. In the process, the output signal of one of the output channels is preferably actually transmitted outwardly, while the other output signal is only generated as a redundant signal for the comparison operation. Alternatively, an enabling of the output signal may also take place only following a successful comparison. In addition, configuration bits are set in output comparison unit 210 in a way that allows the output signals of the correspondingly selected output channels to be enabled by enable unit 213 for the comparison (in particular, by an EXOR function). Output comparison unit 210 may simultaneously configure and implement a plurality of comparisons (thus, comparisons of a plurality of output channel pairs, respectively groups).

Figure 3:
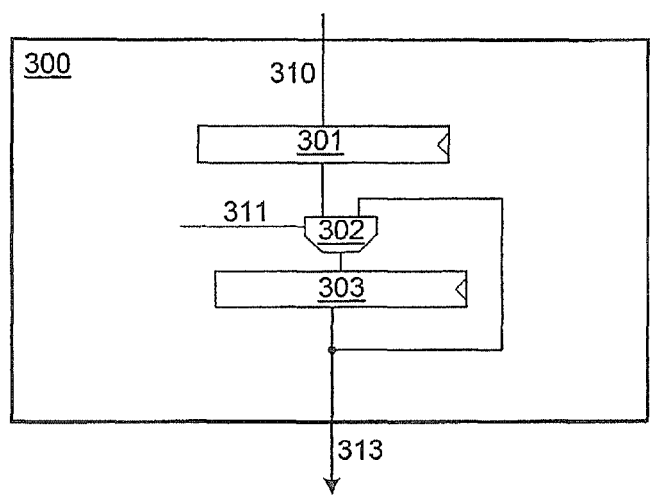
FIG. 3 shows a circuit configuration for processing a comparison result.

A circuit configuration for processing, respectively storing a comparison result is schematically shown in FIG. 3. This circuit configuration 300 is preferably implemented in each case in comparison units 211 and 212 or in error signal control 214 (FIG. 2). The comparison result, thus the result of the EXOR function (for example, successful=bit 0 and failed=bit 1) of each compared bit of the two redundant output signals of an output module is written via connection 310 into first register 301 and accepted into register 303 in response to a clock pulse signal from clock pulse connection 311 via element 302. In this context, it may preferably be provided that the result "error" remain in register 303 (for example, bit 1) for so long, and also may not be overwritten by subsequent results as "error-free" until the corresponding bit, respectively the corresponding result stored in register 303 is reset by the processing unit, respectively by a processing unit command.

An error signal may be transmitted through connection 313 as a function of the value stored in register 303. Thus, if the comparison fails, i.e., the two output signals to be compared do not match, an error may be reported, and an interrupt initiated at the external processor (external processing unit), for example. The error signal may likewise be transmitted externally to the timer module, or to monitoring unit 107, be stored and then tested there (at regular or irregular intervals) by the external processing unit.

Figure 4:
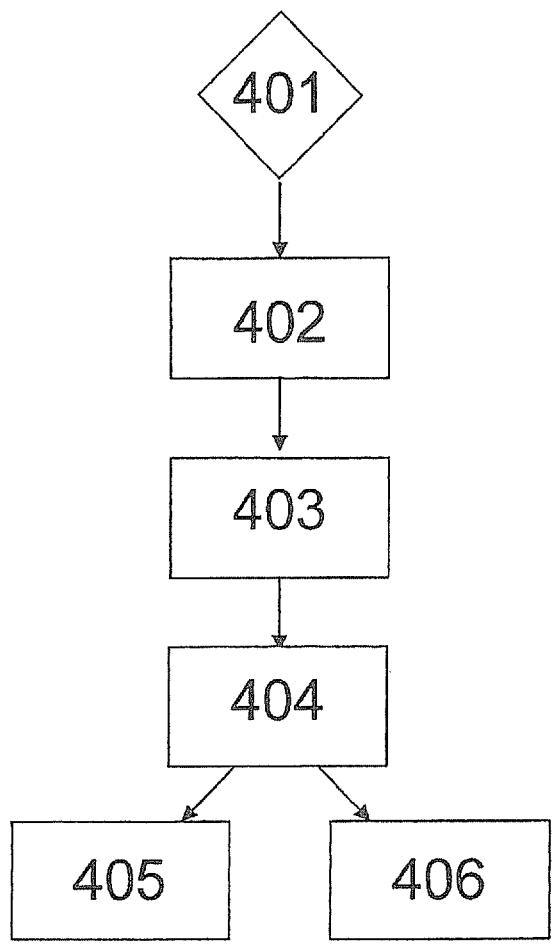
FIG. 4 schematically illustrates a method for the synchronous bit-precise comparison of output signals of a timer module.

FIG. 4 shows the sequence of a method for the bitwise synchronous comparison of redundant output signals. What is meant in this context by redundant output signals is that the output signals (in the error-free case) generate the same output signals with bit precision.

In a first step 401, in response to configuration of at least two output channels of one or various output module(s) (201, 202) of a hardware data processing unit 100, the output channels generate redundant output signals, and the output signal generation begins synchronously. For the redundant output signal generation, the same information required for generation must be available to the various output channels.

In a second step 402, which may take place before, during or after the first step, in response to a configuration of an output comparison module 210 of hardware data processing unit 100, the at least two output channels are enabled for a comparison of the output signals thereof. Thus, in particular, the output signals of these output channels are enabled for comparison units 211 or 212.

These output signals are directly linked in a bitwise EXOR operation in comparison unit 211 or 212, without storing or delay, and thus compared bitwise to check for conformity (step 403).

An error or comparison result identifier is stored in status register 303 (step 404). In particular, in the case of an error (EXOR result 1, i.e., different bits of the comparison signals in the same comparison clock cycle), the comparison result identifier is kept in status register 303 and not overwritten by any potential subsequent comparison results of individual bits, until the status register is reset, for example, by the external processing unit.

Depending on the value of the comparison result identifier in register 303, error measures, such as error signal outputting or processing unit interrupt are undertaken (EXOR result 1, error, step 405) or not (EXOR result 0, no error, step 406) in register 303 in alternative steps 405 and 406.

What is claimed is:

1. A timer module, comprising:
   at least two output channels configured to generate redundant output signals, wherein the generation of the redundant output signals begins synchronously;
   an output comparison module for a comparison of the redundant output signals to each other by an EXOR logic operation, wherein the output comparison module is configured to selectively enable or not enable the redundant output signals for the comparison; and
   a storage unit for storing a result of the EXOR logic operation which indicates a mismatch in the comparison until the result is reset by an external access.

2. The timer module as recited in claim 1, further comprising:
   a reset unit for resetting the result based on an access of a processing unit external to the timer module.

3. The timer module as recited in claim 2, further comprising:
   an output unit for at least one of (i) outputting an error signal in the case of a mismatch in the comparison, and (ii) initiating a processing unit interrupt in the case of a mismatch in the comparison.

4. A method for testing output signals of a timer module having at least two output channels, comprising:
   generating redundant output signals by the at least two output channels, wherein the generation of the redundant output signals begins synchronously;
   comparing, by an output comparison module, the redundant output signals to each other using an EXOR logic operation, wherein the output comparison module selectively enables or not enables the redundant output signals for the comparison; and
   storing in a storage unit a result of the EXOR logic operation which indicates a mismatch in the comparison until the result is reset by an external access.

5. The method as recited in claim 4, wherein the stored result which indicates a mismatch in the comparison is reset based on an access of a processing unit external to the timer module.

6. The method as recited in claim 4, further comprising:
   at least one of (i) outputting an error signal in the case of a mismatch in the comparison, and (ii) initiating a processing unit interrupt in the case of a mismatch in the comparison.

* * * * *